United States Patent Office 3,694,172
Patented Sept. 26, 1972

3,694,172
SYNTHESIS OF CHLORINE AND BROMINE PERCHLORATE
Carl J. Schack, Chatsworth, Donald Pilipovich, Agoura, and Richard D. Wilson, Canoga Park, Calif., assignors to North American Rockwell Corporation
No Drawing. Filed May 25, 1970, Ser. No. 40,377
Int. Cl. C01b *11/02, 11/20*
U.S. Cl. 423—466                                   19 Claims

ABSTRACT OF THE DISCLOSURE

The new oxides chlorine perchlorate ($ClOClO_3$) and bromine perchlorate ($BrOClO_3$) are provided. Chlorine perchlorate is prepared by the reaction of cesium perchlorate or nitronium perchlorate with chlorine fluorosulfate or chlorine monofluoride. Bromine perchlorate is prepared by the reaction of cesium perchlorate or nitronium perchlorate with bromine fluorosulfate or by the reaction of chlorine perchlorate with elemental bromine.

BACKGROUND OF THE INVENTION (1) Field of the invention

This invention is in the field of inorganic chlorine and bromine oxides and to methods for their preparation.

(2) Description of the prior art

The four known stable oxides of chlorine are $Cl_2O$, $ClO_2$, $Cl_2O_6$ and $Cl_2O_7$. More recently, a fifth compound of limited stability has been reported with the empirical formula $ClO_{1.5}$ and the postulated composition of $$OClClO_2$$

[J. Am. Chem. Soc., 89, 2795 (1967)]. The known stable oxides of bromine are $Br_2O$ and $BrO_2$.
Fluorine perchlorate ($FOClO_3$) is a known compound. This compound can be prepared by the reaction of fluorine with concentrated perchloric acid. Fluorine perchlorate is highly reactive and tends to explode on freezing and during other simple operations. [J. Am. Chem. Soc., 69, 677 (1947).]

SUMMARY OF THE INVENTION

The new oxides chlorine perchlorate ($ClOClO_3$) and bromine perchlorate ($BrOClO_3$) are provided. Chlorine perchlorate is prepared by the reaction of cesium perchlorate or nitronium perchlorate with chlorine fluorosulfate or chlorine monofluoride. Bromine perchlorate is prepared by the reaction of cesium perchlorate or nitronium perchlorate with bromine fluorosulfate or by the reaction of chlorine perchlorate with elemental bromine.

Accordingly, an object of the present invention is the provision of new chlorine and bromine oxides and methods for their preparation.

Further objects will become apparent upon reading the undergoing specification and claims.

DESCRIPTION OF THE PREFERRED EMBODIMENTS

New inorganic oxides of the formula $XOClO_3$ are provided wherein X is chlorine or bromine. The oxide of the formula $XOClO_3$ wherein X is chlorine is chlorine perchlorate. The oxide of the formula $XOClO_3$ wherein X is bromine is bromine perchlorate. These inorganic oxides are prepared by reacting a perchlorate of the formula $MClO_4$ wherein M is cesium or nitronium with a fluorosulfate of the formula $XSO_3F$ wherein X is chlorine or bromine. This reaction is depicted as follows:

$$MClO_4 + XSO_2F \rightarrow MSO_3F + XOClO_3$$

Chlorine perchlorate is produced at a temperature of about −20 to −80° C. when the fluorosulfate is chlorine fluorosulfate. This reaction is preferably conducted at a temperature of about −35 to −45° C. Bromine perchlorate is produced at a temperature of about −20 to −30° C. when the fluorosulfate is bromine fluorosulfate. This reaction is preferably conducted at a temperature of about −25° C.

The chlorine and bromine perchlorate preparative reaction is essentially complete in about 24 to 96 hours, however, longer reaction times are preferred in order to ensure complete consumption of the fluorosulfate since its vapor pressure and that of chlorine perchlorate and bromine perchlorate are too close to allow separation by a fractionation procedure. For the same reason, it is preferred that the perchlorate $MClO_4$ be employed in excess of the quantity theoretically required for complete reaction. At least 5% by weight excess perchlorate should be employed and preferably about 10 to 20%. The reaction occurs in high yield, for example, in the range of 75 to 95% of the theoretical yield.

Chlorine perchlorate can also be prepared by reacting cesium or nitronium perchlorate with chlorine monofluoride at a temperature of about −45 to −78° C. This reaction is depicted as follows:

$$MClO_4 + ClF \rightarrow MF + ClOClO_3$$

wherein M is cesium or nitronium. It is preferred that a large excess of chlorine monofluoride be employed over the quantity of chlorine monofluoride theoretically required for complete reaction. It is preferred to employ a 3 to 5 fold excess. The reaction is preferably conducted at a temperature of about −78° C. The yields from this reaction are low (approximately 5%).

Bromine perchlorate can also be prepared by reacting elemental bromine with chlorine perchlorate at a temperature of about −35 to −78° C. The reaction is preferably conducted at a temperature of about −35 to −45° C. This reaction is depicted as follows:

$$Br_2 + 2ClOClO_3 \rightarrow Cl_2 + 2BrOClO_3$$

This reaction proceeds quantitatively and yields a purer product than the corresponding fluorosulfate reaction for the preparation of bromine perchlorate.

Chlorine perchlorate is a pale yellow liquid and nearly white when frozen. It is stable for limited periods of time at room temperature in clean, dry prepassivated stainless steel or perhalogenated plastic equipment. Storage at −45° C. in stainless steel cylinders has resulted in less than 1% decomposition per week over a 12 week period. Products of this low-temperature decomposition are $Cl_2$, $O_2$ and $Cl_2O_6$ which are readily separated from the chlorine perchlorate. The overall stability of chlorine perchlorate approaches that of the four known stable oxides of chlorine.

Bromine perchlorate is a red liquid which freezes below −78° C. It is unstable at ambient temperature and decomposes slowly at approximately −20° C.

Chlorine perchlorate and bromine perchlorate can be reacted with anhydrous metal chlorides (e.g., anhydrous potassium chloride) to form the respective anhydrous metal perchlorate (e.g., anhydrous potassium perchlorate) and the easily separated by-product chlorine. Because of their low melting points, the reaction of chlorine perchlorate and bromine perchlorate with anhydrous metal chlorides can be carried out at temperatures of about −78° C. thereby enabling close control of the reaction. The ability of chlorine perchlorate and bromine perchlorate to participate in these anhydrous metal chloride reactions without added solvent makes the compounds particularly useful. Chlorine perchlorate and bromine perchlorate can also be reacted with gaseous hydrogen chloride and hydrogen bromide at about −78° C. to form anhydrous perchloric acid and the easily separated by-products chlorine and bromine, respectively. Anhydrous perchloric acid can be prepared in this manner without the complications often encountered in the conventional preparation wherein the explosive by-product $Cl_2O_7$ is generated. In general, chlorine perchlorate and bromine perchlorate can be used in analogous manner to other oxides of chlorine, for example, in water treatment and purification.

EXAMPLE 1

A 30 ml. stainless steel cylinder was loaded with 2.45 g. (10.5 mmol) of cesium perchlorate ($CsClO_4$). After evacuation, chlorine fluorosulfate ($ClSO_3F$) (218 cm.$^3$, 9.73 mmol) was condensed into the cylinder at −196° C. The reaction was allowed to proceed by maintaining the cylinder at approximately −45° C. for 44 days. The products were separated by fractional condensation in U traps cooled to −78, −112 and −196° C. Little or no gases not condensable at −196° C. were found. The −196° C. fraction (8.0 cm.$^3$, 0.36 mmol) was primarily elemental chlorine with a small amount of sulfuryl fluoride ($SO_2F_2$), while the −78° C. fraction was negligibly small. Pure chlorine perchlorate ($ClOClO_3$) (207 cm.$^3$, 9.24 mmol) was retained at −112° C. The yield was 95%.

EXAMPLE 2

A similar reaction to Example 1 using nitronium perchlorate ($NO_2ClO_4$) (2.0 g., 13.7 mmol) and chlorine fluorosulfate (200 cm.$^3$, 8.93 mmol) produced chlorine perchlorate (170 cm.$^3$, 7.59 mmol) in 82% yield after 12 days.

The solid products from the reactions in Examples 1 and 2 were identified as cesium fluorosulfate-cesium perchlorate ($CsSO_3F$-$CsClO_4$) and nitronium fluorosulfate-nitronium perchlorate ($NO_2SO_3F$-$NO_2ClO_4$) mixtures by their infrared spectra.

Values for the molecular weight of chlorine perchlorate as determined by gas density, assuming ideal gas behavior, were 133, 135, 134 (calculated 135). The vapor pressure of chlorine perchlorate over the temperature range −47° C. to 21° C. is [T (° C.), P (mm.)]: −46.8, 8; −31.3, 21; −24.2, 32; 0.0, 119; 5.0, 150; 11.2, 202; 18.9, 283; 20.9. 305. The vapor pressure-temperature relationship is described by the equation $\log P_{mm} = 7.8156 - 1568.0/t.\,°K$. The normal boiling point calculated from the equation is 44.5° C., with a heat of vaporization of 7.17 kcal./mole and a Trouton constant of 22.6. Samples of chlorine perchlorate frozen as a ring in the upper part of a Teflon tube were observed to melt at −117±2° C. The densities measured in a Pyrex pycnometer at −78.8, 0.0 and 21.2° C. were 1.98, 1.82, and 1.75 g./ml. Over this temperature range the density $\rho$ is given by the equation: $\rho = 1.806 - 2.30 \times 10^{-3}\,t.\,°C$. The infrared spectrum was recorded in stainless steel or trifluorochloroethylene cells fitted with silver chloride windows over the range 4000–400 cm.$^{-1}$ at a variety of pressures. The principal bands observed were: 1282 (v.s.), 1041 (s.), 752 (w.), 661 (sh.), 652 (s.), 585 (sh.), 574 (sh.), 561 (m.) and 511 (w.) cm.$^{-1}$.

EXAMPLE 3

A prepassivated 30 ml. stainless steel cylinder was loaded with nitronium perchlorate (2 g., 13.8 mmol) in the dry box. A less than equimolar amount of bromine fluorosulfate ($BrSO_3F$) (2.1 g., 11.8 mmol) was then condensed into the cylinder from the vacuum line and the reaction allowed to proceed at −20° for five days. The volatile products were separated by fractional condensation in U traps cooled to −45, −64 and −196° C. Unreacted bromine fluorosulfate was retained at −45° C. while the trap cooled to −196° C. contained only a small amount of the by-products chloryl fluoride ($FClO_2$) and perchloryl fluoride ($FClO_3$). Bromine perchlorate was trapped at −64° C.

EXAMPLE 4

A similar reaction to Example 3 using bromine fluorosulfate (1.5 g., 8.44 mmol) and cesium perchlorate (3 g. 12.9 mmol) instead of nitronium perchlorate yielded bromine perchlorate.

EXAMPLE 5

A prepassivated 30 ml. stainless steel cylinder was loaded at −196° C. with elemental bromine ($Br_2$) (1.36 mmol) that had been dried over phosphorus pentoxide ($P_2O_5$) and then chlorine perchlorate (2.76 mmol). The closed cylinder was left at −45° C. for five days. After recooling first to −78° C. and later at −64° C., the material which was volatile at those temperatures was pumped out and trapped at −78°, −112° and −196° C. The trapped material consisted of chlorine (1.38 mmol), chlorine perchlorate (0.04 mmol) and bromine perchlorate (∼0.1 mmol), respectively, as indicated by vapor pressure and/or infrared spectra. The product bromine perchlorate (0.469 g., 2.61 mmol) was identified by elemental analysis and infrared spectrum.

We claim:
1. A compound of the formula $XOClO_3$ wherein X is chlorine or bromine.
2. The compound of claim 1 in which X is chlorine.
3. The compound of claim 1 in which X is bromine.
4. A method for preparing chlorine perchlorate of the formula $ClOClO_3$ comprising reacting a perchlorate of the formula $MClO_4$ wherein M is cesium or nitronium with chlorine fluorosulfate of the formula $ClSO_3F$ at a temperature of about −20 to −80° C.
5. The method of claim 4 in which the temperature is about −35 to −45° C.
6. The method of claim 4 in which the perchlorate of the formula $MClO_4$ is employed in excess of the quantity theoretically required for complete reaction with chlorine fluorosulfate.
7. The method of claim 6 in which at least 5% by weight excess perchlorate is employed.
8. The method of claim 6 in which about 10 to 20% by weight excess perchlorate is employed.
9. A method for preparing bromine perchlorate of the formula $BrOClO_3$ comprising reacting a perchlorate of the formula $MClO_4$ wherein M is cesium or nitronium with bromine fluorosulfate of the formula $BrSO_3F$ at a temperature of about −20 to −30° C.
10. The method of claim 9 in which the temperature is about −25° C.
11. The method of claim 9 in which the perchlorate of the formula $MClO_4$ is employed in excess of the quantity theoretically required for complete reaction with chlorine fluorosulfate.
12. The method of claim 11 in which at least 5% by weight excess perchlorate is employed.
13. The method of claim 11 in which about 10 to 20% by weight excess perchlorate is employed.
14. A method for preparing chlorine perchlorate of the formula $ClOClO_3$ comprising reacting a perchlorate of the formula $MClO_4$ wherein M is cesium or nitronium with chlorine monofluoride at a temperature of about −45 to −78° C.
15. The method of claim 14 in which the temperature is about −78°C.
16. The method of claim 14 in which chlorine monofluoride is employed in excess of the quantity theoretically required for complete reaction with the perchlorate of the formula $MClO_4$.
17. The method of claim 16 in which a 3 to 5 fold excess of chlorine monofluoride is employed.
18. A method for preparing bromine perchlorate of the formula $BrOClO_3$ comprising reacting bromine with chlorine perchlorate of the formula $ClOClO_3$ at a temperature of about −35 to −78° C.

19. The method of claim 18 in which the temperature is about −35 to −45° C.

References Cited

UNITED STATES PATENTS 3,404,958  10/1968  Beardell et al. _____ 23—367
3,035,893   5/1962  Roberts _____ 23—367

OTHER REFERENCES

Mellor: Comprehensive Treatise on Inorganic and Theoretical Chemistry, Vol. 2 (1922), pp. 301 and 320.

Mellor: Comprehensive Treatise on Inorganic and Theoretical Chemistry, Supplemental II, Part I (1956), p. 543.

OSCAR R. VERTIZ, Primary Examiner

H. S. MILLER, Assistant Examiner